United States Patent Office 3,256,315
Patented June 14, 1966

3,256,315
PREPARATION OF TERTIARY ALCOHOLS AND NITRILES BY ADDITION OF SECONDARY ALCOHOLS AND NITRILES TO ACETYLENE
Israel A. David and John C. Sauer, Wilmington, Del., assignors to E. I. du Pont de Nemours and Company, Wilmington, Del., a corporation of Delaware
No Drawing. Filed Apr. 20, 1959, Ser. No. 807,293
10 Claims. (Cl. 260—465.8)

This invention relates to new coupling reactions of acetylene to an alcohol or a nitrile. More particularly this invention relates to a process for preparing carbon-to-carbon addition compounds of an acetylenic compound and an alcohol or a nitrile.

Among the reactions of acetylene which have been extensively studied are those in which the acetylene functions as a vinylating agent. Alcohols add successfully to acetylene in the presence of alkaline catalysts to form the corresponding vinyl ethers. However, the preparation of carbon-to-carbon addition products of acetylenic compounds and alcohols or nitriles have not heretofore been achieved.

It is an object of this invention to provide a process for preparing carbon-to-carbon addition compounds of an acetylenic compound and an alcohol or nitrile. A further object is to prepare valuable chemical products from inexpensive acetylene and an alcohol or a nitrile. Other objects will appear hereinafter.

These and other objects of this invention are accomplished by the following process which comprises heating and reacting in contact with a free-radical producing catalyst at a temperature of at least 50° C., as the sole reactants, an acetylenic compound under a pressure of at least 100 lb./sq. in. and an alcohol or a nitrile having the respective OH and CN groups bonded directly to a carbon bearing a single hydrogen atom.

In practice a pressure reactor is charged with the alcohol or nitrile and free-radical generating compound. The reactor is cooled to −80° C., swept with oxygen-free nitrogen, and then evacuated. The reactor is then pressured with the acetylene so that at a temperature which is at least 50° C. the pressure is in excess of 100 lb./sq. in. After reaction is complete, as evidenced by cessation of pressure drop, the reaction mixture is permitted to cool to ambient room temperature, unreacted gaseous reactants are vented, the reactor is opened, and the contents are discharged. The desired product is isolated from the reaction mixture by distillation or other methods known to those skilled in the art.

The examples which follow illustrate but do not limit this invention. Unless otherwise stated, the reactor employed was of 400 ml. capacity.

Example I

A stainless steel pressure reactor was charged with 100 ml. of isopropyl alcohol (78 g., $n_D^{25}$ 1.3752), and 4 ml. of ditertiary butyl peroxide. The reactor was closed, pressure tested with deoxygenated nitrogen, cooled thoroughly in solid carbon dioxide-acetone, and evacuated to 5–10 mm. pressure. The reactor was then placed in an electrically heated box and connected to a source of acetylene. Acetylene was then injected at 200–215 lb./sq. in. pressure during 3.5 hours, while the temperature was maintained at 120–135° C. At the end of this time, the reactor was cooled to room temperature, excess pressure vented, and the reaction mixture fractionated. There was recovered 57.5 g. of isopropyl alcohol and a 4-g. fraction distilling at 88–103° C./7 mm., which crystallized on standing at room temperature. Infrared analysis indicated the structure to correspond to:

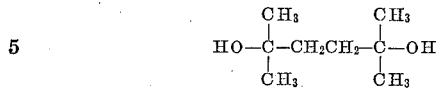

i.e., alpha,alpha,alpha',alpha'-tetramethyltetramethylene glycol. A portion of this material was recrystallized from ethyl acetate, M.P. 60–70° C.

Anal.—Calcd. for $C_8H_{18}O_2$: C, 65.8; H, 12.3. Found: C, 66.5; H, 12.2.

In a test run similar to the above, there was obtained, in addition to the alpha,alpha,alpha',alpha'-tetramethyltetramethylene glycol, about 5 g. of a clear, amber solid which could not be distilled at 7 mm. pressure. This residue contained 77.2% carbon and 10.6% hydrogen which corresponds to a product having an empirical formula corresponding to about one mole of isopropyl alcohol per two moles of acetylene. The infrared analysis of this material indicates both hydroxyl and methyl groups.

Example II

The reactor of Example I was charged with 40 g. of isopropyl alcohol, previously purified by refluxing 6 hours with alpha,alpha'-azobis-isobutyronitrile followed by careful fractionation, and 4 g. of ditertiary butyl peroxide in a glass liner specially designed to fit the stainless steel reactor. Acetylene was injected during 10 hours at a pressure range of 320–370 lb./sq. in. at 115° C. After removing 29 g. of isopropyl alcohol from the reaction mixture, there was obtained 3 g. of material, B.P. 83–86° C., $n_D^{25}$ 1.3841, which had an extremely fragrant odor unlike that of isopropyl alcohol. This fraction and the residue were composited with a similar product obtained in a second test run made under virtually identical conditions. From the combined runs there was obtained alpha,alpha-dimethyl allyl alcohol (3.5 g.), $n_D^{25}$ 1.4093. This material was further characterized by its infrared spectrum, which indicated the proper unsaturation and the presence of gem dimethyl groups and a hydroxyl group. Hydrogenation of this unsaturated alcohol gave tertiary amyl alcohol, B.P. 96–101° C., $n_D^{25}$ 1.3942. The infrared spectrum of the phenyl urethane of the tertiary amyl alcohol prepared in this way corresponded to that of the phenyl urethane from a commercial sample of tertiary amyl alcohol. Fractionation of the higher boiling materials from these combined test runs resulted in the isolation of alpha,alpha,alpha',alpha'-tetramethyltetramethylene glycol in 7.2% yield and 25% conversion. In addition, a still higher boiling material, believed to be an acetylene/isopropyl alcohol telomer, was obtained in significant quantity (13 g. from 80 g. of isopropyl alcohol). Two fractions of this "telomer" had the following analyses:

Anal. of cut B.P. 105–220° C./2 mm. Found: C, 72.4; H, 11.5; g. $H_2$/g. sample, 0.008.

Anal. of nonvolatile residue.—Found: C, 76.2; H, 10.8; g. $H_2$/g. sample, 0.0045.

Example III

Using the procedure of Example I, 50 g. of isobutyronitrile and 4 g. of ditertiary butyl peroxide were reacted with acetylene at 125–140° C. for 10 hours at a pressure of 385–315 lb./sq. in. In addition to recovering 39 g. of unreacted isobutyronitrile, there remained a residue (4 g.) which deposited crystals upon standing. Redistillation of this material gave 2 g. of a fraction, B.P. 53–125° C./100 mm., which showed strong absorption for CH=CH in the infrared. Another 1.5 g. of product, B.P. 100–160° C./12 mm., was a crystalline solid at room temperature and was indicated to be alpha,alpha,alpha', alpha'-tetramethyltetramethylene dinitrile.

*Anal.*—Calcd. for $C_{10}H_{16}N_2$: C, 73.1; H, 9.9. Found: C, 71.8; H, 9.0.

On a melting point block sublimation occurred beginning at about 70° C. and liquefaction was complete at about 115° C.

*Example IV*

A solution of hexanediol-2,5 (80 g.) and 4 ml. ditertiary butyl peroxide was reacted with acetylene as described in Example I at 135° C. during five hours at a pressure of 215–265 lb./sq. in. Two additional, nearly identical test runs were carried out and the products from the three test runs were composited. After removing the hexanediol-2,5 (B.P. 128–132° C./28 mm., $n_D^{25}$ 1.447) (165 g.), the residue was distilled, giving the following fractions:

| Fraction | B.P., ° C. | Weight, g. | $n_D^{25}$ |
|---|---|---|---|
| 2 | 90–118/4 | 2.0 | 1.4538 |
| 3 | 118–140/4 | 2.1 | 1.4732 |
| 4 | 146–150/4 | 1.0 | 1.4842 |
| 5 | 158–178/6 | 1.5 | 1.4888 |
| 6 | 175–210/10 | 3.3 | |
| 7 | 210–230/10 | 3.0 | |

The infrared and n-m-r (nuclear magnetic resonance) spectral data indicated that cut 4 was a product of 1 mole $C_2H_2$ with 1 mole of hexanediol-2,5 and contained a vinyl group.

The initiators used in the process of this invention are the known free-radical forming addition polymerization catalysts, i.e., the free-radical liberating organic compounds of general formula R'XXR, in which R is a monovalent organic radical or hydrogen, R' is a monovalent organic radical, and X is an element of atomic number 7 to 8, i.e., nitrogen or oxygen. Examples of such compounds are the peroxygen and the azo free-radical producing catalytic compounds, such as ditertiary amyl peroxide, dibutyl peroxide, tertiary butyl pentamethylpropyl peroxide, ditertiary butyl peroxide, tertiary butyl hydroperoxide, 1-hydroxyethyl hydroperoxide-1, benzoyl peroxide, lauroyl peroxide, acetyl peroxide, acetyl benzoyl peroxide, alpha - (carbamylazo)isobutyronitrile, alpha-(carbamylazo)isobutyramide, 1,1' - azodicyclohexane-carbonitrile, alpha,alpha'-azobis(alpha-cyclohexylpropionitrile), dimethyl-1,1' - azodicyclohexane - carboxylate, alpha,alpha'-azodiisobutyrate, and the like.

The above free radical-generating initiators are employed in catalytic amounts, i.e. in proportions which are at least 0.1% by weight of the reactants. Generally, however, amounts in the range of 2–20% are employed since within this range good reaction rates with good yields of desired products are realized.

In place of the specific acetylene of the detailed examples there can be used any acetylenic compound corresponding to the formula R—C≡C—R', in which R is hydrogen and R' is selected from the group consisting of hydrogen or monovalent hydrocarbon radical free of unsaturation, especially of not more than 12 carbon atoms, i.e., alkyl, particularly straight chain alkyl, containing not more than 7 carbon atoms. Examples of such radicals are methyl, ethyl, octyl, decyl, dodecyl, and the like. Acetylenic compounds within the purview of this invention are the alkynes, such as acetylene, methylacetylene, and the like.

The alcohols and nitriles employable in the process of this invention are the alcohols and nitriles which have the OH and CN groups attached directly to a carbon bearing a single hydrogen atom, and preferably contain up to 20 carbon atoms. Examples of such compounds are 1-methylpropionitrile, 1-benzyl propionitrile, 1-butylbutyronitrile, isopropanol, 1-butylbutanol, 1-ethylpentanol, 1-naphthyldecanol, 1,2-, 1,3-, and 1,4-dicyanocyclohexanes, 2,5-dihydroxyhexane, 1,2-dihydroxypropane, 1,2-, 1,3-, and 1,4-dihydroxycyclohexanes, and the like. The aliphatic, including cycloaliphatic, alcohols and nitriles, particularly the alkanols and alkanenitriles are preferred.

In the reaction between the acetylene and alcohol or nitrile, equivalent amounts of the reactants are consumed. In practice, the reactor is charged with the alcohol or nitrile and the acetylene is then added to provide a pressure of at least 100 lb./sq. in. at reaction temperature. The pressures used are in the range of 100 to 700 lb./sq. in. and the temperatures at least 50° C. and usually in the range of 75° to 175° C.

If desired, the alcohol or nitrile can be used in excess of the theoretically required amount. In such case the excess simply functions as a reaction medium.

Although not necessary because, as pointed out above, the alcohol or nitrile can also function as a reaction medium, there can be used an inert reaction medium. Suitable media are isooctane, diethyl ether, and the like. The amount of reaction medium is not critical and it can be varied over wide limits. Generally it is at least equal to the weight of the acetylene and alcohol or nitrile charged into the reactor. Amounts of reaction medium which are several fold in excess of the combined weights of the acetylene, alcohol and nitrile may be used and in some cases this has advantages in minimizing formation of undesired side reaction products.

The reaction between the acetylene and alcohol or nitrile can be conducted as a batch operation or as a semicontinuous or continuous process. In practice a continuous process has practical advantages because it makes it possible to recover unreacted reactants for recirculation into the reaction system. It is suggested that the proper safety precautions be observed in the handling of the materials in the present process. See, for example, Cairns and Sauer, J. Organic Chemistry, volume 20, p. 627 (1955).

The process of this invention makes it possible to prepare valuable chemicals from cheap acetylene. Thus, it makes possible the preparation of alpha,alpha,alpha', alpha'-tetramethyltetramethylene glycol from isopropyl alcohol and acetylene. This glycol is of value in preparing polyesters useful as solvents, plasticizers, and the like. Similarly, alpha,alpha,alpha',alpha' - tetramethyltetramethylenedinitrile is obtained from isobutyronitrile and acetylene. The dinitriles are of interest since they can be hydrogenated to diamines which are useful as polyamide intermediates.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for preparing a member of the class consisting of a tertiary alcohol and tertiary nitrile which comprises heating, at a temperature of at least about 50° C. but below 175° C. and a pressure of at least about 100 lbs./in.² but below 700 lbs./in.², a reaction mixture comprising (a) a catalyst selected from the group consisting of organic peroxygen and azo free radical producing compounds, (b) a compound of the formula R—C≡C—R' wherein R is hydrogen and R' is selected from the group consisting of hydrogen and alkyl of up to 12 carbon atoms, and (c) a compound of the class consisting of hydroxy substituted hydrocarbons and cyano substituted hydrocarbons having the hydroxyl and cyano groups respectively bonded to carbon bearing a single hydrogen atom, and said compound having up to 20 carbon atoms.

2. Process as set forth in claim 1 wherein said compound (b) is acetylene.

3. Process as set forth in claim 1 wherein (a) is ditertiary butyl peroxide and is present in an amount within the range of 2 to 20% by weight of the reactants.

4. Process as set forth in claim 1 wherein (a) is an azo free radical producing catalytic compound and is present in an amount within the range of from 2 to 20% by weight of the reactants.

5. Process for preparing a carbon-to-carbon addition compound of acetylene and a hydroxy substituted hydrocarbon containing up to 20 carbon atoms and having a hydroxyl group bonded directly to a carbon bearing a single hydrogen atom, which comprises heating acetylene and said hydroxyl compound at a temperature of at least 50° C. and below 175° C. under a pressure of at least 100 lbs./in.$^2$ and below 700 lbs./in.$^2$, in contact with a catalyst selected from the group consisting of free radical liberating, organic peroxygen and azo compounds.

6. Process for preparing a carbon-to-carbon addition compound of acetylene and a cyano substituted hydrocarbon containing up to 20 carbon atoms and having the cyano group bonded directly to a carbon bearing a single hydrogen atom, which comprises heating acetylene and said nitrile at a temperature of at least 50° C. and below 175° C. under a pressure of at least 100 lbs./in.$^2$ and below 700 lbs./in.$^2$, in contact with a catalyst selected from the group consisting of free radical liberating, organic peroxygen and azo compounds.

7. Process for preparing a carbon-to-carbon addition compound of acetylene and isopropyl alcohol, which comprises heating acetylene and isopropyl alcohol at a temperature of at least 50° C. and below 175° C. under a pressure of at least 100 lbs./in.$^2$ and below 700 lbs./in.$^2$, in contact with ditertiary butyl peroxide.

8. A process for the preparation of an addition product of acetylene and isopropyl alcohol which comprises heating acetylene and isopropyl alcohol at a temperature of about 100° to 175° C. and under a pressure of about 100 to 300 p.s.i.g. in contact with a catalyst selected from the group consisting of ditertiary butyl peroxide and tertiary butyl hydroperoxide.

9. Process for preparing a carbon-to-carbon addition compound of acetylene and isobutyronitrile, which comprises heating acetylene and isobutyronitrile at a temperature of at least 50° C. and below 175° C. under a pressure of at least 100 lbs./in.$^2$ and below 700 lbs./in.$^2$ in contact with ditertiary butyl peroxide.

10. Process for preparing a carbon-to-carbon addition compound of acetylene and hexanediol-2,5, which comprises heating acetylene and hexanediol-2,5 at a temperature of at least 50° C. and below 175° C. under a pressure of at least 100 lbs./in.$^2$ and below 700 lbs./in.$^2$, in contact with ditertiary butyl peroxide.

References Cited by the Examiner
UNITED STATES PATENTS

| | | | |
|---|---|---|---|
| 2,655,525 | 10/1953 | Banes et al. | 260—642 X |
| 2,713,071 | 7/1955 | Erchok | 260—642 X |

OTHER REFERENCES

Bergmann, "The Chemistry of Acetylene and Related Compounds," (1948), page 80.

Copenhaver et al.: "Acetylene and Carbon Monoxide Chemistry," (1949), pages 32 to 40.

Urry et al.: "Jour. Am. Chem. Soc.," vol. 75 (1953), pages 250–251.

LEON ZITVER, *Primary Examiner.*

CHARLES B. PARKER, *Examiner.*

J. P. BRUST, A. H. SUTTO, M. B. ROBERTO, J. E. EVANS, *Assistant Examiners.*